(No Model.)

J. T. McELFRESH.
MOTH TRAP FOR BEE HIVES.

No. 295,786. Patented Mar. 25, 1884.

UNITED STATES PATENT OFFICE.

JOHN T. McELFRESH, OF FARMINGDALE, ILLINOIS.

MOTH-TRAP FOR BEE-HIVES.

SPECIFICATION forming part of Letters Patent No. 295,786, dated March 25, 1884.

Application filed December 31, 1883. (No model.)

*To all whom it may concern:*

Be it known that I, JOHN T. MCELFRESH, a citizen of the United States of America, residing at Farmingdale, in the county of Sangamon and State of Illinois, have invented certain new and useful Improvements in Moth-Traps for Bee-Hives; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in moth-traps for bee-hives, its object being to provide a trap or means whereby moths will be prevented from entering the hive or honey-comb; and to this end my invention consists in providing the entrance of the hive with an outer casing or frame, which is provided with a deflecting piece, under which outer frame is placed a perforated plate, which covers an opening into a water-tank, as will be hereinafter more fully set forth, and pointed out in the claims.

Figure 1:
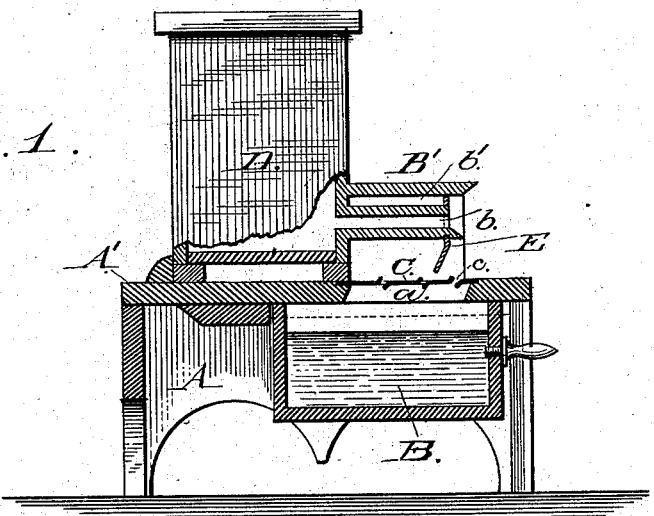
Figure 2:
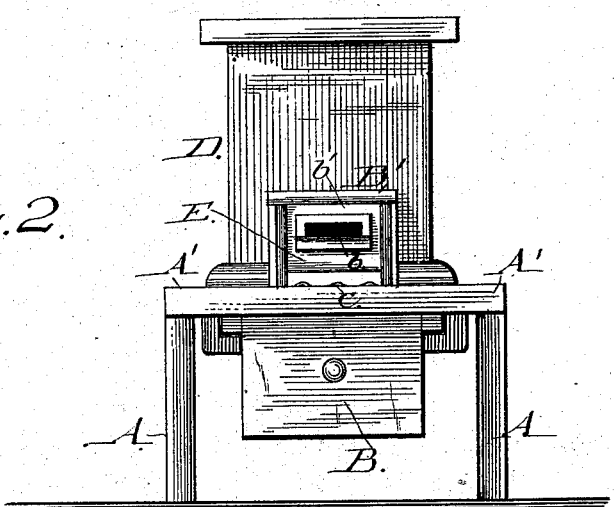
Figure 4:
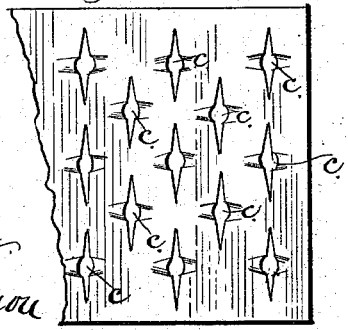
Figure 3:
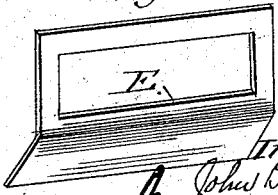

In the accompanying drawings, Figure 1 is a sectional view. Fig. 2 is a front view, and Figs. 3 and 4 are detailed views.

A represents the supports for the hive, which are provided with a top, A', which is provided with an opening, a, under which opening is secured a drawer or water-receptacle, B, which is supported by the board A' by means of side pieces, upon which the same slides. The hole or opening above this drawer is provided with beveled edges, and is cut away at its upper part, so that the plate may lie within the recess so as to be flush with the upper portion of the board A'.

C represents a metallic plate, which is placed over the opening a, and said plate is provided with transverse openings c, from which a substantially circular portion is removed. These openings or slots are then bent so that the edge nearest the front portion of the opening will project downwardly, while the rear edge projects upwardly, as is shown in Fig. 4 of the accompanying drawings.

The hive, which is indicated by the letter D, is provided with a passage-way or entrance, b, for the bees, which passage-way is located a short distance above the base of the hive, and is surrounded by the outer wall and top, B', so as to provide a space, b', between the bee-passage b and the wall B'. The lower portion of the bee-passage is provided with an outwardly-projecting bottom, and the edges of the outer wall are beveled, as shown, and extend beyond the passage-way c. Over the mouth or entrance to the passage-way b, and secured within suitable recesses or grooves between the outer wall and this passage, is secured a slotted deflecting plate, E, which plate has its larger portion, which is located under the bee-passage, bent rearwardly, and extends downwardly, so as to leave a passage-way between the perforated plate C and the portion E.

The construction of my invention will be fully understood from the foregoing description and accompanying drawings, and I will now proceed to describe the manner in which the moths are trapped.

The moth, or "miller," as it is familiarly called, will, as is well known from its habits, seek an entrance at the lowest portion of the hive, and owing to its supposed desire to conceal itself will enter through the openings c in the plate, which openings are too small for the entrance of the bees, and will be drowned in the water contained in the receptacle secured under the plate.

Having thus described my invention, what I desire to claim as new and secure by Letters Patent is—

1. In an attachment for bee-hives, the water-receptacle B, having located above the same the perforated plate with transverse slots having central circular portions, and upwardly and downwardly turned edges located under the bee-entrance of a hive, substantially as shown, and for the purpose set forth.

2. In combination with a bee-hive having a raised bee passage or entrance, b, surrounded by an outer wall, B', and a plate, E, bent at its lower end, the base A', provided with an opening, and perforated plate C, located above a water-tank, substantially as shown.

In testimony whereof I affix my signature in presence of two witnesses.

JOHN T. McELFRESH.

Witnesses:
 THOMAS T. BROWN,
 JOSEPH M. GROUT.